US009810183B2

(12) United States Patent
Amaral et al.

(10) Patent No.: US 9,810,183 B2
(45) Date of Patent: Nov. 7, 2017

(54) HEAT EXCHANGER FOR THERMAL MANAGEMENT SYSTEMS FOR THE FEEDING OF FUEL IN INTERNAL COMBUSTION ENGINES

(71) Applicant: MAHLE METAL LEVE S.A., Jundiaí-SP (BR)

(72) Inventors: Tadeu Miguel Malagó Amaral, São Paulo (BR); Ricardo Roveri Bueno, São Paulo (KR); Edson Valdomiro de Azevedo Júnior, São Paulo (BR); Fernando Jun Yoshino, Jundiaí (BR)

(73) Assignee: MAHLE METAL LEVE S.A., Jundiaí-SP (BR)

( * ) Notice: Subject to any disclaimer, the term of this patent is extended or adjusted under 35 U.S.C. 154(b) by 181 days.

(21) Appl. No.: 14/900,351

(22) PCT Filed: Jul. 1, 2014

(86) PCT No.: PCT/BR2014/000216
§ 371 (c)(1),
(2) Date: Dec. 21, 2015

(87) PCT Pub. No.: WO2015/000047
PCT Pub. Date: Jan. 8, 2015

(65) Prior Publication Data
US 2016/0153408 A1    Jun. 2, 2016

(30) Foreign Application Priority Data
Jul. 2, 2013 (BR) ............................ 1020130170860

(51) Int. Cl.
*F02G 5/00* (2006.01)
*F01P 9/00* (2006.01)
(Continued)

(52) U.S. Cl.
CPC ............ *F02M 31/16* (2013.01); *F01M 5/002* (2013.01); *F01M 5/005* (2013.01); *F01P 3/20* (2013.01);
(Continued)

(58) Field of Classification Search
CPC ...... F02M 31/10; F02M 31/102; F02M 31/14; F02M 31/16; F01M 5/002; F28D 9/0037;
(Continued)

(56) References Cited

U.S. PATENT DOCUMENTS 4,759,401 A * 7/1988 Pfouts .................... F01M 5/002
165/51
5,409,058 A    4/1995 Yuasa et al.
(Continued)

FOREIGN PATENT DOCUMENTS

BR    102013004382-6 A2    11/2014
BR    102013017086 A2    6/2015
(Continued)

OTHER PUBLICATIONS

PCT International Search Report dated Sep. 12, 2014, issued in corresponding PCT Application No. PCT/BR2014/000216.

*Primary Examiner* — Syed O Hasan
(74) *Attorney, Agent, or Firm* — Alston & Bird LLP (57) ABSTRACT

The internal combustion engines (M) of the invention are provided with a cooling water circuit, associated with a water radiator and with a lubricant oil circuit. The heat exchanger (HE) comprises an inlet and an outlet of water connected, in series, to an outlet of the water radiator, by means of a cooled water conduit and of the cooling water circuit, and to an inlet of the water radiator, by means of a return conduit and a hot water conduit; a fuel inlet nozzle and a fuel outlet nozzle, selectively connected to the fuel supply to the engine (M); and an inlet and an outlet of
(Continued)

lubricant oil, connected to the lubricant oil circuit by means of respective oil conduits.

20 Claims, 5 Drawing Sheets (51) Int. Cl.
| | |
|---|---|
| F02M 31/16 | (2006.01) |
| F01M 5/00 | (2006.01) |
| F02M 31/10 | (2006.01) |
| F28D 9/00 | (2006.01) |
| F01P 3/20 | (2006.01) |
| F01P 11/08 | (2006.01) |
| F02M 31/14 | (2006.01) |
| F28D 21/00 | (2006.01) |

(52) U.S. Cl.
CPC ............. *F01P 11/08* (2013.01); *F02M 31/10* (2013.01); *F02M 31/102* (2013.01); *F02M 31/145* (2013.01); *F28D 9/00* (2013.01); *F28D 9/005* (2013.01); *F28D 9/0093* (2013.01); *F28D 2021/0087* (2013.01); *F28D 2021/0089* (2013.01); *F28F 2280/06* (2013.01); *Y02T 10/126* (2013.01)

(58) Field of Classification Search
CPC .................. F28D 9/005; F28D 9/0093; F28D 2021/0089; F01P 11/08
USPC ............................................. 123/553, 41.01
See application file for complete search history.

(56) References Cited

U.S. PATENT DOCUMENTS

| | | | | |
|---|---|---|---|---|
| 5,896,834 | A | * | 4/1999 | Gruner .................... F28D 9/005 123/196 AB |
| 7,753,105 | B2 | * | 7/2010 | Acre ...................... B60H 1/3227 165/140 |
| 8,752,522 | B1 | * | 6/2014 | Cohen ...................... F01P 3/18 123/195 A |
| 2007/0267169 | A1 | | 11/2007 | Acre |
| 2016/0017822 | A1 | | 1/2016 | Amaral et al. |

FOREIGN PATENT DOCUMENTS

| | | |
|---|---|---|
| CN | 105593504 A | 5/2016 |
| EP | 2080976 A1 | 7/2009 |
| EP | 3017178 A1 | 5/2016 |
| FR | 2846736 A1 | 5/2004 |
| JP | 2002-195777 A | 7/2002 |
| WO | WO 2015/000047 A1 | 1/2015 |

* cited by examiner

HEAT EXCHANGER FOR THERMAL MANAGEMENT SYSTEMS FOR THE FEEDING OF FUEL IN INTERNAL COMBUSTION ENGINES

CROSS-REFERENCE TO RELATED APPLICATIONS

This application is the National Stage of International Application No. PCT/BR2014/000216, filed Jul. 1, 2014 and published as WO2015/000047 on Jan. 8, 2015. The International Application claims priority to Brazilian Application Serial No. BR1020130170860, filed Jul. 2, 2013. All of the above applications are incorporated herein by reference in their entireties.

FIELD OF THE INVENTION

The present invention refers to a heat exchanger, for example, of the plate type, developed to allow a triple thermal interaction, either simultaneous or sequential, between the fuel to be injected in an internal combustion engine in normal operation, and the two cooling fluids defined by the lubricant oil and water, in order for the fuel to be selectively and suitably heated under control of a thermal management system for feeding the engine different fuels, each presenting a respective and particular flash point or vaporization point.

BACKGROUND OF THE INVENTION

As described in patent application BR 10 2013 004382-6, of the same assignee, improvements in energy efficiency, handling, and reduction in the emission of pollutants may be achieved by means of a thermal management system for the feeding of fuel in an internal combustion engine, which is able to maintain the fuel at a temperature more adequate to the combustion upon its feeding to the engine. The thermal management system includes a heat exchanger which uses, as a heat source, the thermal energy dissipated by the engine itself, without the need for generating extra energy.

One of the means for dissipating the thermal energy is defined by the vehicle radiator, which comprises a heat exchanger to cool the engine, preventing the latter from overheating by exchanging heat from the engine and its components to the environment, by means of the vehicle radiator and using water as the intermediate fluid.

However, the heat transferred from the engine to the radiator water represents an energy which is lost and even undesired, since if this heat remains stored in the water, it loses efficiency as a thermal exchanging fluid.

The cooler the radiator water, the more heat it will be able to absorb from the engine in a smaller amount of time.

Another known means for dissipating thermal energy from the engine is the lubricant oil itself which, besides lubricating moving parts of the engine, allows the heat generated by the latter to be carried outside from the engine and dissipated into the environment. Some engine parts, such as the crankshaft, bearings, camshaft, rods and pistons, may have their cooling entirely done by the lubricant oil of the engine. When overheated, the oil loses viscosity and may deteriorate, and consequently loses the desired lubricant properties and the capacity of cooling internal parts of the engine, impairing the correct operation of engine components, leading to major damages to the engine or even to the total loss of the vehicle engine.

Some vehicles, particularly heavy vehicles, are provided with an oil radiator, which takes the form of a heat exchanger, usually of the plate type, provided between the engine block and the required oil filter, usually downstream the latter, or even incorporated in a single block with the oil filter, as usually is the case in heavy vehicles, in order to function as a heat exchange enhancer between the lubricant oil and the radiator water. However, the oil radiators presently in use do not exchange heat between the oil and the fuel.

Thus, as mentioned in said prior patent BR 10 2013 004382-6, in low temperature environments in which the fuel has the temperature thereof reduced to values at a distant low from the flash point temperature ("cold fuel"), there is an increased or reduced difficulty in burning the fuel fed to the engine, said difficulty being greater when using fuels containing a high flash point. It should be further observed that the typical pressure inside a fuel distributor in 1.0 L vehicles of indirect injection is around 4.2 bar. In such condition, the vaporization temperature of the fuel is greater than the vaporization temperature under atmospheric pressure. For vehicles provided with direct fuel injection such values (pressure and vaporization temperature) are even higher. It is also known that the increase in fuel temperature makes easier to obtain a spray of micrometric droplets, which will burn more easily when in contact with the spark from the ignition coil or when compressed to a certain pressure (diesel).

Although the thermal exchange between the heat dissipated by the operating engine and the fuel is sufficient for, in principle, suitably heating a somewhat "cold" fuel, this is not a working condition that presents an optimized thermo-energetic efficiency, allowing engine failures, jolts, slow acceleration response and even high emission of pollutants due to poor fuel burning.

In "flex vehicles" (fueled by ethanol and/or gasoline in any mixture proportion) it is known that the engine yield is not optimized. An effective fuel heating system may provide optimized conditions by taking the fuel (for example, ethanol or gasoline) to better burning conditions (by heating the fuel to temperatures closer to its vaporization point) and a consequent better yield of the engine.

Due to the facts mentioned above, in the prior patent application BR 10 2013 004382-6 it was proposed a managed system for fuel heating, in order to be maintained operating during the entire engine running time, in order to achieve high performance (energetic optimization) of the engine, better vehicle handling with fast response upon acting on the acceleration pedal, with optimized torque and power and lower pollutant emissions, not only in "flex" type vehicles (two or three fuels), but also in vehicles provided with an internal combustion engine operating with a single fuel, either liquid or gas.

Figure 3:
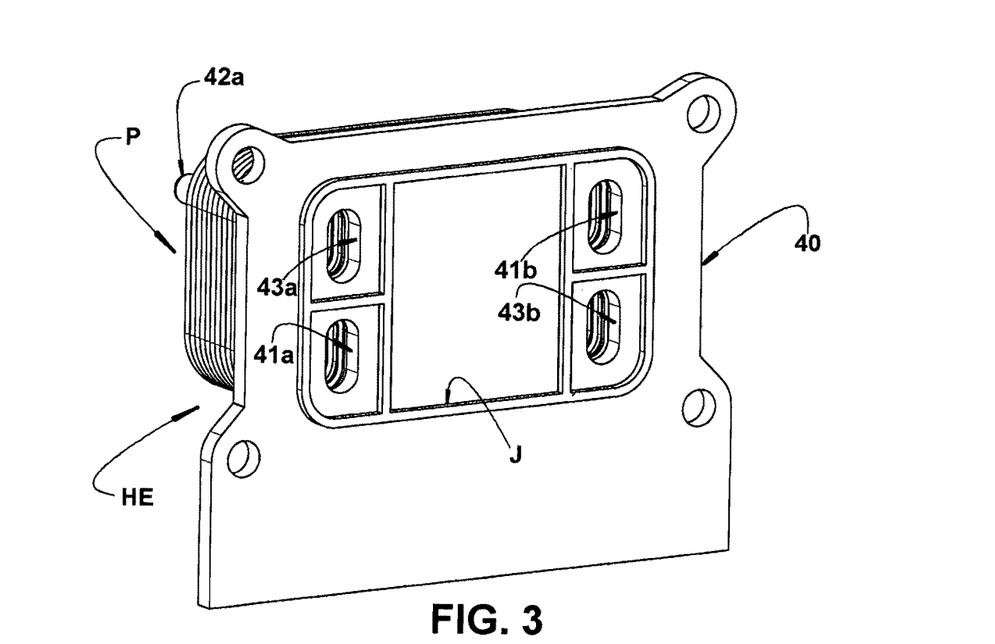
FIG. 3 represents a perspective view of a possible construction for the proposed heat exchanger, incorporating a support defined by a flange, in the illustrated construction, for seating and securing the heat exchanger to the motor or to any other structure.
Figure 4:
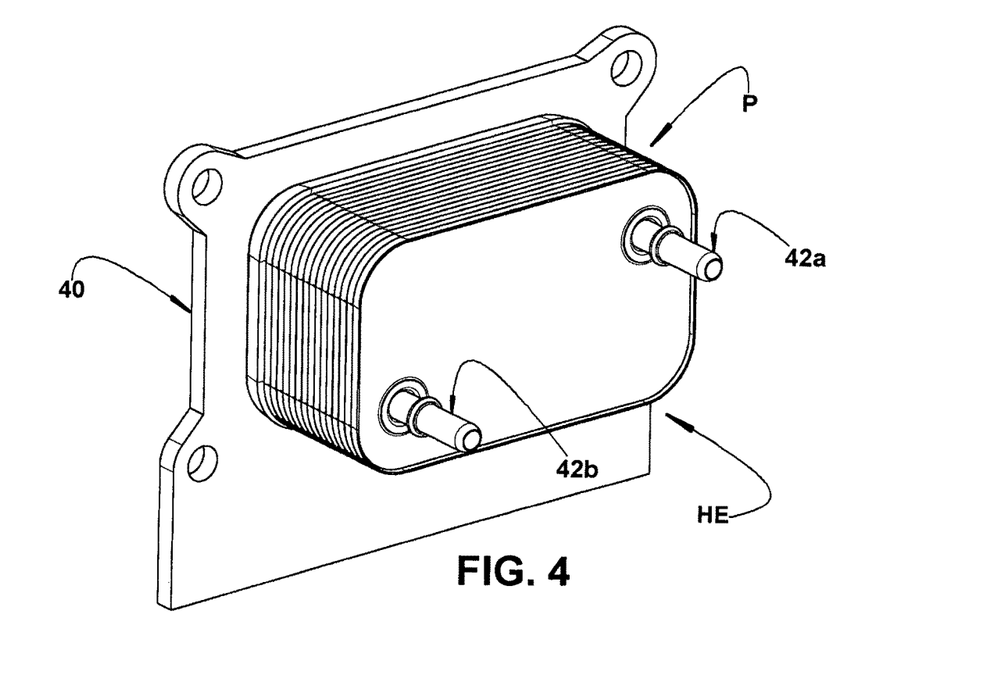
FIG. 4 represents a perspective view of the heat exchanger of FIG. 3, when seen from the side opposite to that in which is incorporated the flange for seating and securing the heat exchanger.
Figure 5:
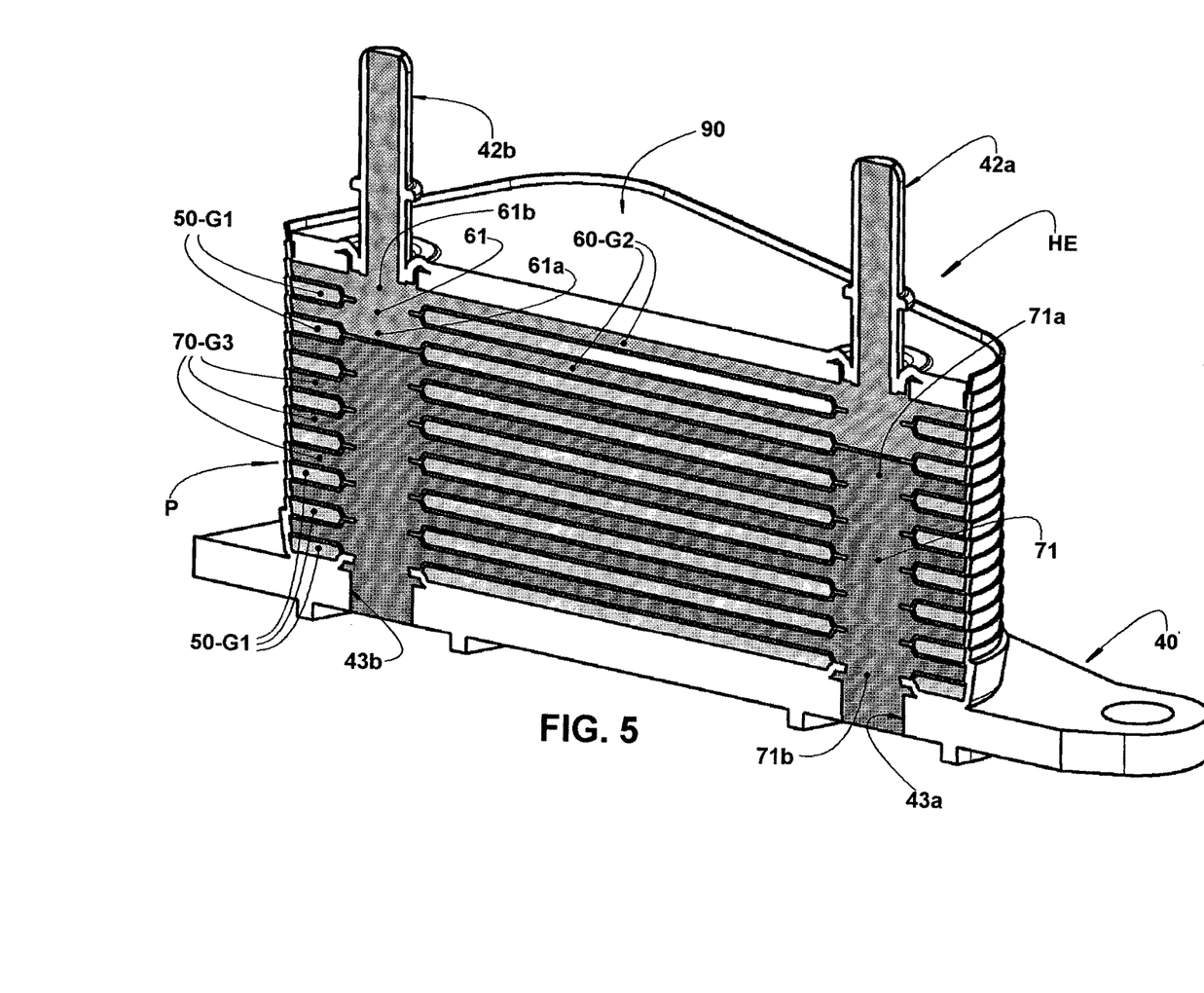
FIG. 5 represents a sectional view of the heat exchanger illustrated in FIGS. 3 and 4, said cut being taken according to a diametrical plane common to both the oil inlet and outlet and to the inlet and outlet fuel nozzles.
Figure 6:
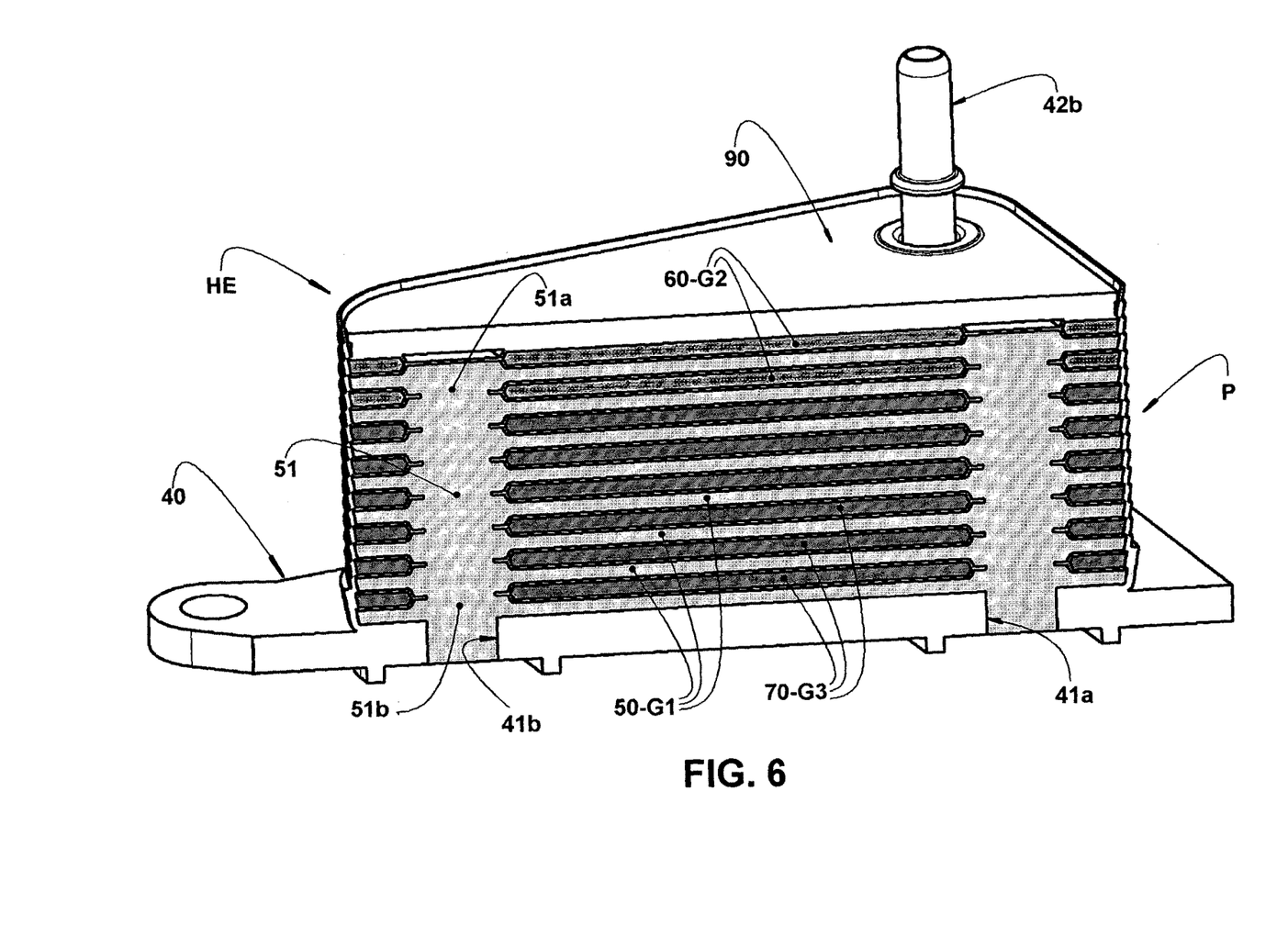
FIG. 6 represents a sectional view of the heat exchanger illustrated in FIGS. 3 and 4, said cut being taken according to the plane diametrical to the cooling water inlet and to the cooling water outlet provided in the heat exchanger.

One of the solutions proposed in said prior patent application, specifically the one illustrated in FIG. 3, comprises a management system for the feeding of fuel which is able to absorb, by means of a common heat exchanger, the desired thermal energy both from the cooling water flow and from the engine lubricating oil. However, said prior patent application does not limit the invention to one type of heat exchanger which may be applied to the thermal management system, in order to use, when necessary, the heat dissipated by the flows of cooling water and lubricant oil heated inside the engine and carried to the respective water and oil radiators.

SUMMARY OF THE INVENTION

The present invention has as an objective to provide a heat exchanger, for example of the plate type, to be used together with a thermal management system for the feeding of fuel in an internal combustion engine under normal operation, in order to provide a triple thermal interaction, either simultaneous or sequential, between the fuel and the two cooling fluids, defined by the lubricant oil and water, in order to selectively and adequately heat the fuel to temperatures closer to the vaporization point thereof.

The present heat exchanger is applied to thermal management systems for the feeding of fuel in internal combustion engines, which is internally provided with a cooling water circuit, having an inlet connected to an outlet of a water radiator by means of a cooled water conduit, external to the engine, and an outlet connected to the water radiator by means of a hot water conduit external to the engine; and a lubricant oil circuit, also internal to the engine and having an inlet and an outlet. According to the invention, the heat exchanger comprises: an inlet and an outlet of water, respectively connected, in series, to the outlet of the water radiator, by means of the cooled water conduit and of the cooling water circuit, and to the inlet of the water radiator, by means of a return conduit and of the hot water conduit; a fuel inlet nozzle and a fuel outlet nozzle, selectively connected in parallel, to the fuel supply tube; and an inlet and an outlet of lubricant oil, connected, respectively, to the outlet and to the inlet of the lubricant oil circuit by means of respective oil conduits.

In the preferred embodiment, the heat exchanger is defined by a group of chambers formed by a first, a second and a third group of overlapped chambers, every two adjacent chambers being from different groups, the chambers of each group having regions spaced from each other and held each in fluid communication to a respective conduit having an inner end open to an outer chamber of the respective group, and an outer end. The outer ends of the conduits of the first group of chambers containing water are connected in series to the cooling water circuit by means of the water inlet and outlet of the heat exchanger. The outer ends of the conduits of the second group of chambers, containing fuel, are selectively connected, in parallel, to the fuel feeding tube, by means of the fuel inlet and outlet nozzles of the heat exchanger; and the outer ends of the conduits of the third group of chambers, containing lubricant oil, are selectively connected to the lubricant oil circuit.

The invention therefore provides a triple heat exchanger, having a compact construction, operatively associated with an automatic thermal management system for the feeding of fuel to an internal combustion engine under an operational regime, allowing a selective, simultaneous or sequential thermal exchange between the three fluids defined by the lubricant oil circulating inside the engine, the cooling water circulating through a water radiator and through the interior of the engine, and also by the fuel to be injected in the engine at an adequate temperature for the complete burning thereof inside the combustion chamber.

With the thermal exchange between the three fluids in the triple heat exchanger, it is possible, by means of a simple and efficient construction, to obtain the advantages of cooling the lubricant oil and the radiator water, with double energetic use for heating the fuel to be fed to the engine.

The proposed heat exchanger, when used together with an automatic thermal management system, allows the heating of the fuel, either single or in a mixture, to be carried to the injection system of the engine in an enhanced temperature condition for the combustion thereof, thereby reducing fuel consumption, reducing damages to the environment and improving the efficiency of the engine and of the vehicle to which said engine is associated with, the thermal energy used for selectively heating the fuel being obtained from the thermal energy itself dissipated by the internal combustion engine.

BRIEF DESCRIPTION OF THE DRAWINGS

The invention will be described below, with reference to the enclosed drawings, given by way of example of possible configurations of the proposed heat exchanger, in which.

DESCRIPTION OF THE INVENTION

As mentioned above and illustrated in the attached drawings, the heat exchanger HE of the invention is applied to an internal combustion engine M, using a single fuel or a varying mixture of fuels presenting different vaporization temperatures, as is the case of "flex" engines which use, for example, gasoline, ethanol or a mixture thereof in different proportions.

The heat exchanger HE of the invention was developed to operate together with a thermal management system TMS for the feeding of fuel during the entire vehicle operation, in order to maintain the fuel being supplied to the engine M at an optimized temperature, for an efficient combustion, lower than that of the vaporization point.

The thermal management system TMS may be defined, for example, as described in prior patent application BR10 2013 004382-6, of the same applicant.

Figure 1:
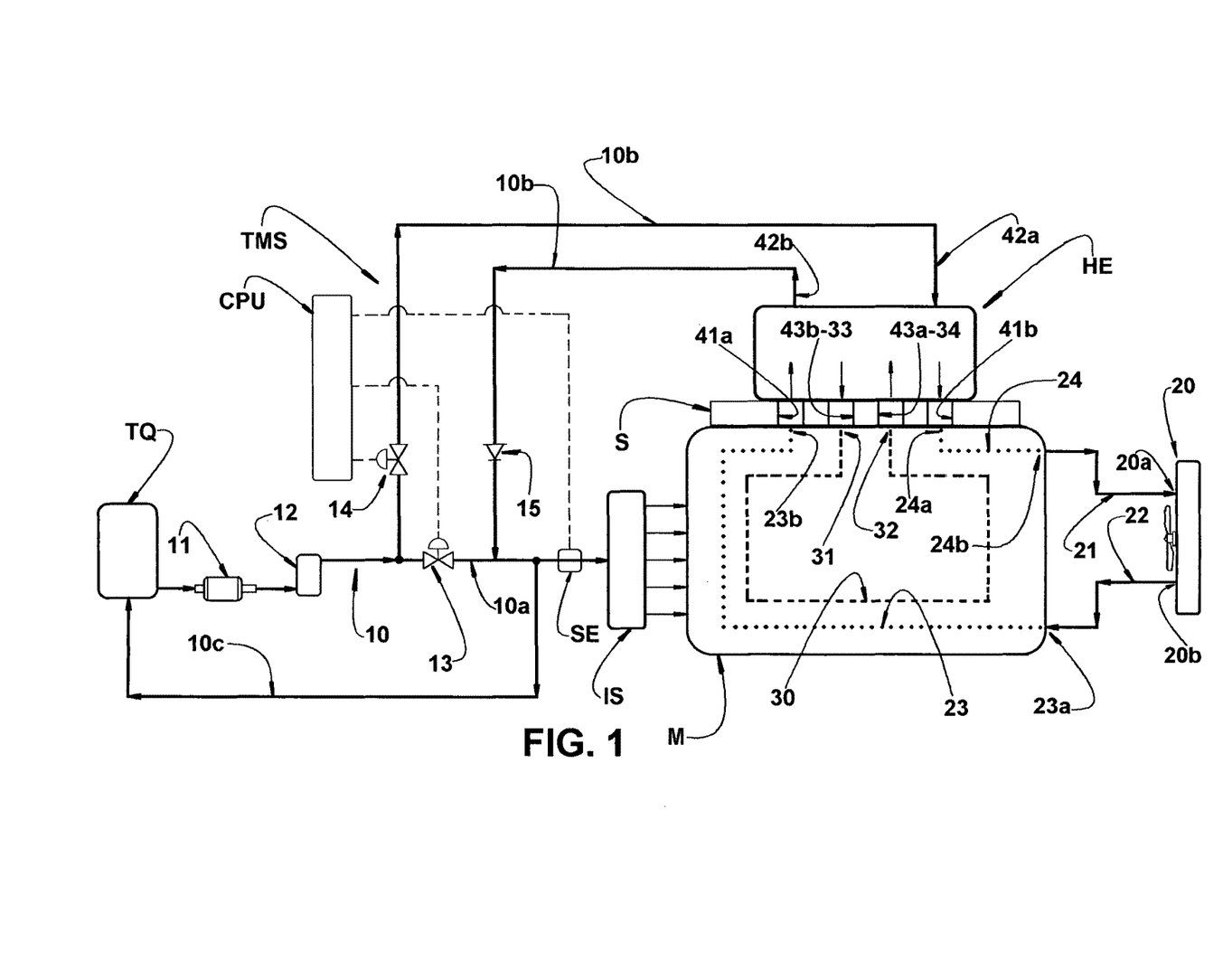
FIG. 1 represents a diagram of a thermal management system for the feeding of fuel to an internal combustion engine, said system being provided with the heat exchanger of the present invention, in a first mounting configuration.
Figure 2:
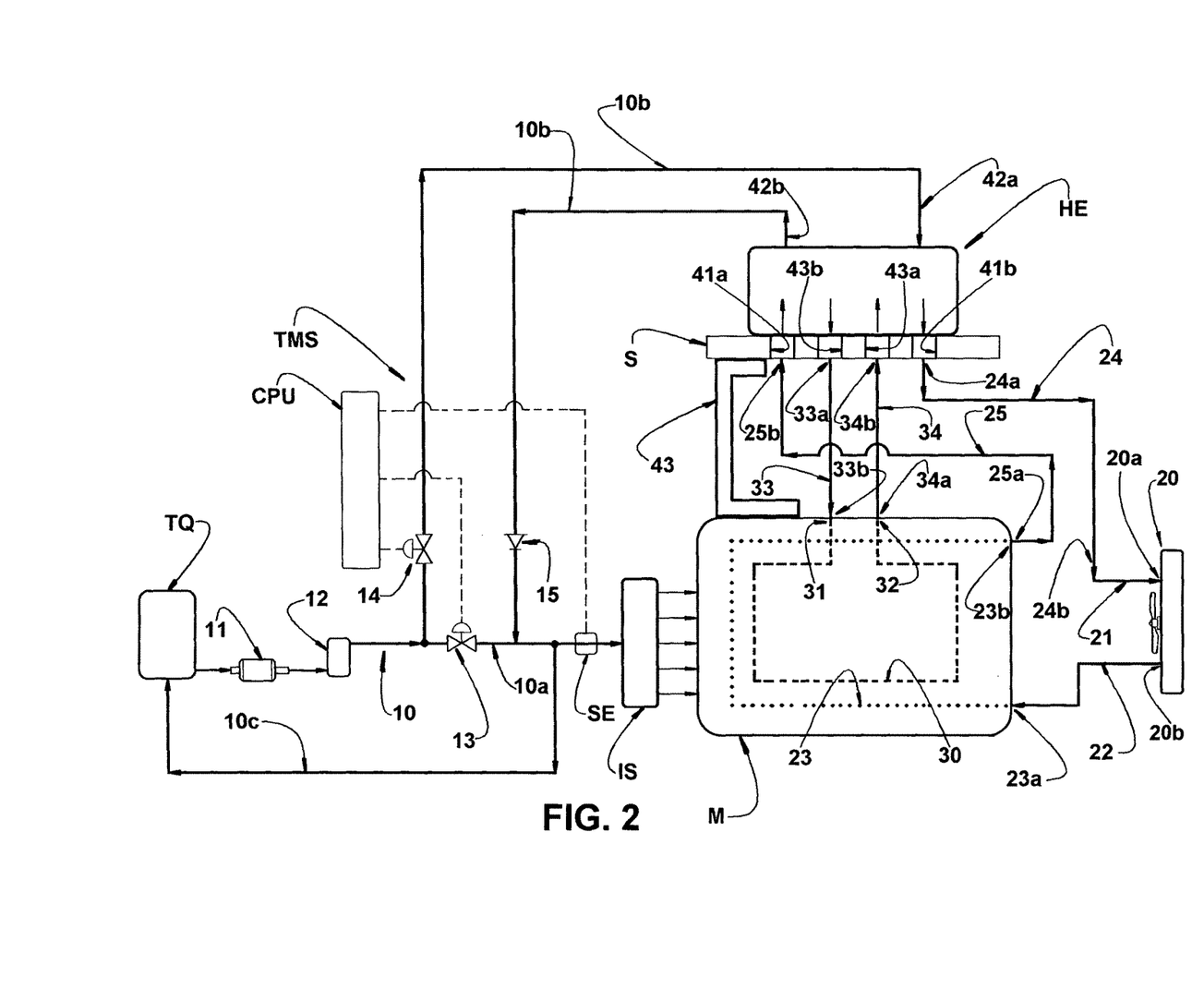
FIG. 2 represents a diagram of a thermal management system for the feeding of fuel to an internal combustion engine, said system being provided with the heat exchanger of the present invention, in a second mounting configuration.

In FIGS. 1 and 2 of the attached drawings are illustrated two possible embodiments for mounting the heat exchanger HE, in a thermal management system TMS, operating in an internal combustion engine M, provided with an injection system IS which is supplied from a fuel tank TQ, by means of a fuel feeding tube 10, provided with a fuel pump 11 and with a filter 12.

The fuel feeding tube 10 comprises a first segment 10a connected to the injection system IS and provided with a first valve 13, and a second segment 10b which defines a by-pass to the first segment 10a, and in which is provided the heat exchanger HE.

In both illustrated mounting conditions, the engine M is operatively associated with a water radiator 20 which has an inlet 20a and an outlet 20b connected, by means of a hot water conduit 21 and a cooled water conduit 22, to a cooling water circuit 23, internal to the engine M, to provide the usual cooling of the latter.

The engine M further comprises therein a circuit 30 for the circulation of lubricant oil, presenting an outlet 31 and an inlet 32, open to the exterior of the engine M, in order to be connected to the heat exchanger HE, as described further below.

The heat exchanger HE is usually affixed to a support S which is mounted, externally and removably, to the engine M or to any other structure for installing in engine M, by any suitable means such as, for example, by non-illustrated screws.

The heat exchanger HE comprises a water inlet 41a and a water outlet 41b, respectively connected, in series, to the outlet 20b of the water radiator 20, by means of the cooled water conduit 22 and of the cooling water circuit 23, and with the inlet 20a of the water radiator 20, by means of a return conduit 24 and of the hot water conduit 21, the latter being positioned in series. The heat exchanger HE further comprises a fuel inlet nozzle 42a and a fuel outlet nozzle 42b, selectively connected in parallel to the fuel supply to engine M; and an inlet and an outlet of lubricant oil 43a, 43b, respectively connected to the outlet 32 and the inlet 31 of the lubricant oil circuit 30 by means of respective oil conduits 34, 33.

The oil conduits 33, 34 present and inlet end 33a, 34a, which are respectively connected to the oil outlet 43b do heat exchanger HE e to the outlet 32 of the lubricant oil circuit 30, and an outlet end 33b, 34b, which are respectively connected to the inlet 31 of the lubricant oil circuit 30 and to the oil inlet 43a of the heat exchanger HE.

The fuel inlet and outlet nozzles 42a, 42b are provided at one side of the heat exchanger HE, other than the side of the latter in which are provided the water inlet and outlet 41a, 41b and the inlet and outlet of lubricant oil 43a, 43b.

In the construction illustrated in FIG. 1, the water inlet and outlet 41a, 41b and the inlet and outlet of oil 43a, 43b of the heat exchanger HE are seated against engine M, with the water inlet and outlet 41a, 41b being respectively held in fluid communication with the cooled water conduit 22, by means of the cooling water circuit 23 internal to engine M, and with the hot water conduit 21 by means of the return conduit 24 and with the inlet and outlet of oil 43a, 43 being directly open to the outlet and to the inlet 32, 31 of the lubricant oil circuit 30.

Still according to the construction illustrated in FIG. 1, the heat exchanger HE is mounted to a support S, for affixing to engine M or to a structure for installing to engine M, which is defined by a flange 40 against one side of which is seated and affixed the heat exchanger HE, said flange 40 presenting through holes in which are respectively defined the water inlet and outlet 41a, 41b and the inlet and outlet of oil 43a, 43b.

In said mounting system in which the heat exchanger HE is seated against the engine M, the return conduit 24 is defined internally to the engine M and presents an inlet end 24a open to the water outlet 41b of the heat exchanger HE and an outlet end 24b open to the hot water conduit 21. In this mounting arrangement, the oil conduits 33, 34 are defined by the respective through holes of the flange 40, said holes defining, in turn, the inlet and outlet of oil 43a, 43b of the heat exchanger HE.

Still in the constructive form illustrated in FIG. 1, the flange 40 has one side, opposed to that in which the heat exchanger HE is secured, which is seated and affixed against engine M, in order to establish a direct fluid communication of: the water inlet 41a of the heat exchanger HE with the outlet 23b of the cooling water circuit 23; the water outlet 41b of the heat exchanger HE with the inlet 24a of the return conduit 24; and of the inlet and outlet of oil 43a, 43b of the heat exchanger HE with the outlet 32 and to the inlet 31, respectively, of the lubricant oil circuit 30 internal to the engine M.

In FIG. 2 of the drawings it is illustrated a construction in which the heat exchanger HE is not directly seated against the engine M, but mounted to a support S which comprises a flange 40, against one side of which is seated and affixed the heat exchanger HE, and a spacing rod 43, having one side affixed to flange 40 and an opposite side affixed to the engine M. In this second mounting arrangement, the flange 40 may present the same through holes already described in relation to the construction of FIG. 1 and in which are respectively defined the inlet and outlet of water 41a, 41b and the inlet and outlet of oil 43a, 43b of the heat exchanger HE.

In the construction illustrated in FIG. 2, the inlet and outlet of water 41a, 41b of the heat exchanger HE are respectively held in fluid communication, in series, with the cooled water conduit 22, by means of the cooling water circuit 23 and of an inlet conduit 25, external to the engine M, and with the hot water conduit 21, by means of the return conduit 24, and with the inlet and outlet of oil 43a, 43b being maintained in fluid communication with the outlet 32 and with the inlet 31, respectively, of the lubricant oil circuit 30, by means of the respective oil conduits 33, 34, external to the engine M and built of any suitable material.

In the construction of the heat exchanger HE, not seated to the engine M, the return conduit 24 is defined externally to the engine M, presenting an inlet end 24a open to the water outlet 41b and an outlet end 24b open to the hot water conduit 21, with the oil conduits 33, 34 being defined by the respective through holes of the flange 40, which define the inlet and outlet of oil 43a, 43b of the heat exchanger HE.

In a similar manner, in the construction of FIG. 2, the inlet conduit 25, external to the engine M, presents an inlet end 25a open to the outlet 23b of the cooling water circuit 23, and an outlet end 25b open to the water inlet 41a in the heat exchanger HE.

In the construction illustrated in FIGS. 3 to 6 and independently of the manner by which it is mounted to the engine M or to another adjacent support structure, the heat exchanger HE comprises a pack P of chambers 50, 60, 70, formed by a first, a second and a third group G1, G2, G3 of overlapped chambers 50, 60, 70, every two adjacent chambers being of different groups.

The chambers 50, 60, 70 of each group G1, G2, G3 have regions spaced from each other and which are each maintained in fluid communication with a respective conduit 51, 61, 71 having an inner end 51a, 61a, 71a open to an outer chamber of the respective group, and an outer end 51b, 61b, 71b.

The outer ends 51b of the conduits 51 of the first group G1 of chambers 50 are connected in series to the cooling water circuit 23, by means of the inlet and outlet of water 41a, 41b of the heat exchanger HE.

The outer ends 61b of the conduits 61 of the second group G2 of chambers 60 are selectively connected, in parallel, to the fuel feeding tube 10 by means of the fuel inlet and outlet nozzles 42*a*, 42*b* of the heat exchanger HE, allowing the latter to be located in a "by-pass" of the fuel feeding tube 10.

The outer ends 71*b* of the conduits 71 of the third group G3 of chambers 70 are connected to the lubricant oil circuit 30.

The above described construction allows the cooling water and the lubricant oil to respectively circulate through the interior of the chambers 50 of the first group G1 and through the interior of the chambers 70 of the third group G3 of chambers, while the fuel is passed through the chambers 60 of the second group G2, upon detection of the need for heating said fuel before being injected in engine M.

In the constructive form illustrated in FIGS. 3 to 6, the conduits 51, 61, 71 of each group of chambers 50, 60, are located through the interior of the pack P of chambers 50, 60, 70, crossing the chambers located between the end chamber of the respective group, to the interior of which is open the inner end 51*a*, 61*a*, 71*a* of the conduit and the outer end 51*b*, 61*b*, 71*b* of said conduit, the latter being centrally and radially open to the chambers of the respective group crossed by said conduit, in order to allow the flow of fluid along the chambers of each group.

In the illustrated construction, the fuel inlet and outlet nozzles 42*a*, 42*b* project outside from one side of the pack P of chambers 50, 60, 70 opposite to that in which are provided the inlet and outlet of water 41*a*, 41*b* of the heat exchanger HE, with said opposite side being closed by an end cover 90, in which every two adjacent chambers are from different groups and are spaced apart by a common wall W of thermal exchange.

Considering that the temperature of the lubricant oil inside engine M is higher than the temperature of the cooling water and, in turn, the latter is higher than the temperature to which the fuel is to be heated, the chambers 50, 60, 70 of the pack P of chambers are distributed in a manner that the chambers 70 of the third group G3 of chambers 70 present common walls only with the chambers 50 of the first group G1 of chambers.

According to the temperatures of the three fluids in question, a portion of the height of the pack P of chambers adjacent to the outer end 61*b* of the conduits 61 of the second group G2 of chambers 60 may be formed solely by the latter and by at least one of the chambers 50 of the first group G1, with the remaining portion of the height of the pack P of chambers being formed by the remaining of the chambers 50 of the first group G1 containing cooling water 23 and by the chambers 70 of the third group G3, containing lubricant oil. This construction is better illustrated in FIG. 5.

Due to the fact that the thermal energy required for heating the fuel is usually lower than the thermal energy dissipated by the engine M by means of the lubricant oil and the cooling water, the portion of the height of the pack P of chambers, formed solely by the chambers 50, 70 of the first and third group G1, G3 of chambers, is usually greater than the portion of the height formed solely by the first and second group G1, G2 of chambers containing water and fuel.

In the exemplary construction illustrated in FIGS. 3 to 6, the chambers 50, 60, 70 of the pack P of chambers have the same flat elongated shape, and of reduced height in relation to their area, each of the two conduits 51, 61, 71, of each group of chambers 50, 60, 70, being located in an end region of the pack P of chambers opposite to that in which is positioned the other conduit.

The chambers 50, 60, 70 may be built of any suitable material, having high thermal conductivity and being shaped in trays, for example, having a bottom wall with a substantially elongated rectangular shape, and incorporating a peripheral wall of reduced height, whose free end is hermetically seated and affixed under the peripheral region of the bottom wall of an adjacent tray of the pack P of chambers, and the last tray of the pack P may be superiorly closed by the end cover 90 which is hermetically seated and affixed onto the free end of said last tray.

In order to guarantee the tightness of the connection between the through holes of the flange 40, which define the inlets and outlets of water 41*a*, 41*b* and of oil 43*a*, 43*b* of the heat exchanger HE and the outlets 23*b*, 32 and inlets 23*a*, 31 of oil and water of the engine M, the side of the flange 40, to be seated against engine M, is provided with a sealing gasket J surrounding said through holes.

The second segment 10*b* of the fuel feeding tube 10 is coupled to the outer ends 61*b* of the conduits 61 of the second group G2 of chambers 60 of the heat exchanger HE and provided with a second valve 14 located upstream the heat exchanger HE and with a one-way valve 15 located downstream said heat exchanger HE.

The first valve 13 and the second valve 14 may be of the electromagnetic type, commanded by an electronic control unit CPU, which receives different operational parameters from engine M and physic-chemical parameters of the fuel (such as temperature of the fuel being supplied, characteristics of the fuel or of the mixtures of different fuels, fuel injection pressure, pressure loss, etc.), in order to determine the maximum temperature value to be used for commanding the operation of the first and second valves 13, 14. It is usually also provided a return tube 10*c*, connecting the fuel tank TQ to a point of the fuel feeding tube 10, located downstream the second segment 10*b*, in order to allow the return, to tank TQ, of the fuel pumped to the injection system IS, but not consumed by the engine M. However, it should be understood that the return tube 10*c* may be connected to the fuel feeding tube 10 at a point upstream the second segment 10*b*.

The thermal management system TMS, associated with the present heat exchanger HE, may comprise electromagnetic valves individually mounted or in a valve manifold and driven from the electronic control unit CPU which is operatively associated with multiple sensors SE connected to the fuel supply system and to the engine M, in order to allow that the total or partial opening of the valve or valves occur as a function of the real requirements of heating the fuel to a temperature lower than that of vaporization of the single fuel or mixture of fuels.

The invention claimed is:

1. A heat exchanger for thermal management systems for the feeding of fuel in internal combustion engines (M) internally provided with a cooling water circuit, having an inlet, connected to an outlet of a water radiator, by means of a cooled water conduit, external to the engine (M), and an outlet connected to the water radiator by means of a hot water conduit external to the engine (M); and with a lubricant oil circuit having an inlet and an outlet, wherein the heat exchanger (HE) comprises an inlet and an outlet of water, respectively connected, in series, to the outlet of the water radiator, by means of the cooled water conduit and of the cooling water circuit, and with the inlet of the water radiator, by means of a return conduit and through the hot water conduit; a fuel inlet nozzle and a fuel outlet nozzle, selectively connected, in parallel, to the fuel supply to the engine (M); and an inlet and an outlet of lubricant oil, respectively connected to the outlet and to the inlet of the lubricant oil circuit by means of respective oil conduits, wherein: the fuel inlet and outlet nozzles are provided at one side of the heat exchanger (HE) other than the side of the heat exchanger (HE) in which are provided the inlet and outlet of water and the inlet and outlet of lubricant oil; and the heat exchanger is mounted to a support (S), for fixation to the engine (M) or to a structure for installing the engine (M), and defined by a flange, against one side of which is seated and fixed the heat exchanger (HE), said flange presenting through holes, in which are respectively defined the inlet and outlet of water and the inlet and outlet of oil.

2. The heat exchanger, as set forth in claim 1, wherein the inlet and outlet of water and the inlet and outlet of oil are seated against the engine (M), with the inlet and the outlet of water being respectively maintained in fluid communication with the cooled water conduit by means of the cooling water circuit internal to the engine (M), and with the hot water conduit by means of the return conduit, the inlet and outlet of oil being directly open to the outlet and to the inlet of the lubricant oil circuit.

3. The heat exchanger, as set forth in claim 1, wherein the return conduit is defined internally to the engine (M) and presents an inlet end open to the water outlet and an outlet end open to the hot water conduit, the oil conduits being defined by the respective through holes of the flange which define the inlet and outlet of oil of the heat exchanger (HE).

4. The heat exchanger, as set forth in claim 3, wherein the flange has one side, opposite to that for fixation of the heat exchanger (HE), seated and secured against engine (M), in order to establish a direct fluid communication: of the water inlet with the outlet of the cooling water circuit; of the water outlet with the inlet of the return conduit; and of the inlet and outlet of oil respectively with the outlet and with the inlet of the lubricant oil circuit.

5. The heat exchanger, as set forth in claim 1, further comprising a spacing rod, having one side secured to the flange and an opposite side affixed to the engine (M).

6. The heat exchanger, as set forth in claim 5, wherein the inlet and the outlet of water of the heat exchanger (HE) are respectively maintained in fluid communication, in series, with the cooled water conduit, by means of the cooling water circuit and an inlet conduit, and with the hot water conduit, by means of the return conduit, the inlet and the outlet of oil being maintained in fluid communication respectively with the outlet and with the inlet of the lubricant oil circuit, by means of respective oil conduits.

7. The heat exchanger, as set forth in claim 6, wherein the return conduit is defined externally to the engine (M), presenting an inlet end open to the water outlet and an outlet end open to the hot water conduit, the inlet conduit being external to the engine (M) and presenting an inlet end open to the outlet of the cooling water circuit, and an outlet end open to the water inlet in the heat exchanger (HE), the oil conduits being defined by the respective through holes of the flange, which define the inlet and outlet of oil of the heat exchanger (HE).

8. The heat exchanger, as set forth in claim 1, wherein the heat exchanger comprises a pack (P) of chambers, formed by a first, a second and a third group (G1, G2, G3) of overlapped chambers, every two adjacent chambers belonging to different groups, and the chambers of each group having regions spaced apart from each other and held each in fluid communication with a respective conduit having an inner end open to an end chamber of the respective group and an outer end; the outer ends of the conduits of the first group of chambers being connected in series to the cooling water circuit, by means of the inlet and outlet of water; the outer ends of the conduits of the second group (G2) of chambers being selectively connected, in parallel, to the fuel feeding tube by means of the fuel inlet and outlet nozzles; and the outer ends of the conduits of the third group (G3) of chambers being connected to the lubricant oil circuit.

9. The heat exchanger, as set forth in claim 8, wherein the conduits of each group of chambers are located through the interior of the pack (P) of chambers, crossing the chambers located between the end chamber of the respective, to the interior of which is open the inner end of the conduit, and the outer end of said conduit, the latter being centrally and radially open to the chambers of the respective group crossed by said conduit.

10. The heat exchanger, as set forth in claim 9, wherein the fuel inlet and outlet nozzles project outwards from one side of the pack (P) of chambers opposite to that in which are provided the inlet and outlet of water, said opposite side being closed by an end cover.

11. The heat exchanger, as set forth in claim 8, wherein every two adjacent chambers belong to different groups and are spaced apart from each other by a common wall (W) for thermal exchange.

12. The heat exchanger, as set forth in claim 8, wherein the chambers of the pack (P) of chambers are distributed in order that the chambers of the third group (G3) of chambers present common walls only with the chambers of the first group (G1) of chambers.

13. The heat exchanger, as set forth in claim 12, wherein a portion of the height of the pack (P) of chambers adjacent to the outer end (61b) of the conduits of the second group (G2) of chambers is formed only by the latter and by at least one of the chambers of the first group (G1), the remaining of the height of the pack (P) of chambers being formed by the remaining of the chambers of the first group (G1) containing cooling water and by the chambers of the third group (G3) containing lubricant oil.

14. The heat exchanger, as set forth in claim 8, wherein the chambers of the pack (P) of chambers have the same flat and elongated shape and have a reduced height in relation to their area, each of the two conduits of each group of chambers being located in an end region of the pack (P) of chambers opposite to that in which is located the other conduit.

15. A heat exchanger for thermal management systems for the feeding of fuel in internal combustion engines (M) internally provided with a cooling water circuit, having an inlet, connected to an outlet of a water radiator, by means of a cooled water conduit, external to the engine (M), and an outlet connected to the water radiator by means of a hot water conduit external to the engine (M); and with a lubricant oil circuit having an inlet and an outlet, wherein the heat exchanger (HE) comprises an inlet and an outlet of water, respectively connected, in series, to the outlet of the water radiator, by means of the cooled water conduit and of the cooling water circuit, and with the inlet of the water radiator, by means of a return conduit and through the hot water conduit; a fuel inlet nozzle and a fuel outlet nozzle, selectively connected, in parallel, to the fuel supply to the engine (M); and an inlet and an outlet of lubricant oil, respectively connected to the outlet and to the inlet of the lubricant oil circuit by means of respective oil conduits, wherein: the fuel inlet and outlet nozzles are provided at one side of the heat exchanger (HE) other than the side of the heat exchanger (HE) in which are provided the inlet and outlet of water and the inlet and outlet of lubricant oil; and the heat exchanger is mounted to a support (S) comprising a flange, against one side of which is seated and secured the heat exchanger (HE) and a spacing rod, having one side secured to the flange and an opposite side affixed to the engine (M), said flange presenting through holes in which are respectively defined the inlet and the outlet of water and the inlet and the outlet of oil.

16. The heat exchanger, as set forth in claim 15, wherein: the return conduit is defined internally to the engine (M) and presents an inlet end open to the water outlet and an outlet end open to the hot water conduit, the oil conduits being defined by the respective through holes of the flange which define the inlet and outlet of oil of the heat exchanger (HE); and the flange has one side, opposite to that for fixation of the heat exchanger (HE), seated and secured against engine (M), in order to establish a direct fluid communication: of the water inlet with the outlet of the cooling water circuit; of the water outlet with the inlet of the return conduit; and of the inlet and outlet of oil respectively with the outlet and with the inlet of the lubricant oil circuit.

17. The heat exchanger, as set forth in claim 15, wherein: the inlet and the outlet of water of the heat exchanger (HE) are respectively maintained in fluid communication, in series, with the cooled water conduit, by means of the cooling water circuit and an inlet conduit, and with the hot water conduit, by means of the return conduit, the inlet and the outlet of oil being maintained in fluid communication respectively with the outlet and with the inlet of the lubricant oil circuit, by means of respective oil conduits; and the return conduit is defined externally to the engine (M), presenting an inlet end open to the water outlet and an outlet end open to the hot water conduit, the inlet conduit being external to the engine (M) and presenting an inlet end open to the outlet of the cooling water circuit, and an outlet end open to the water inlet in the heat exchanger (HE), the oil conduits being defined by the respective through holes of the flange, which define the inlet and outlet of oil of the heat exchanger (HE).

18. A heat exchanger for thermal management systems for the feeding of fuel in internal combustion engines (M) internally provided with a cooling water circuit, having an inlet, connected to an outlet of a water radiator, by means of a cooled water conduit, external to the engine (M), and an outlet connected to the water radiator by means of a hot water conduit external to the engine (M); and with a lubricant oil circuit having an inlet and an outlet, wherein the heat exchanger (HE) comprises: an inlet and an outlet of water, respectively connected, in series, to the outlet of the water radiator, by means of the cooled water conduit and of the cooling water circuit, and with the inlet of the water radiator, by means of a return conduit and through the hot water conduit; a fuel inlet nozzle and a fuel outlet nozzle, selectively connected, in parallel, to the fuel supply to the engine (M); and an inlet and an outlet of lubricant oil, respectively connected to the outlet and to the inlet of the lubricant oil circuit by means of respective oil conduits, wherein: the fuel inlet and outlet nozzles are provided at one side of the heat exchanger (HE) other than the side of the heat exchanger (HE) in which are provided the inlet and outlet of water and the inlet and outlet of lubricant oil; and the heat exchanger comprises a pack (P) of chambers, formed by a first, a second and a third group (G1, G2, G3) of overlapped chambers, every two adjacent chambers belonging to different groups, and the chambers of each group having regions spaced apart from each other and held each in fluid communication with a respective conduit having an inner end open to an end chamber of the respective group and an outer end; the outer ends of the conduits of the first group (G1) of chambers being connected in series to the cooling water circuit, by means of the inlet and outlet of water; the outer ends of the conduits of the second group (G2) of chambers being selectively connected, in parallel, to the fuel feeding tube by means of the fuel inlet and outlet nozzles; and the outer ends of the conduits of the third group (G3) of chambers being connected to the lubricant oil circuit.

19. The heat exchanger, as set forth in claim 18, wherein: the conduits of each group of chambers are located through the interior of the pack (P) of chambers, crossing the chambers located between the end chamber of the respective, to the interior of which is open the inner end of the conduit, and the outer end of said conduit, the latter being centrally and radially open to the chambers of the respective group crossed by said conduit; and the fuel inlet and outlet nozzles project outwards from one side of the pack (P) of chambers opposite to that in which are provided the inlet and outlet of water, said opposite side being closed by an end cover.

20. The heat exchanger, as set forth in claim 18, wherein: the chambers of the pack (P) of chambers are distributed in order that the chambers of the third group (G3) of chambers present common walls only with the chambers of the first group (G1) of chambers; and a portion of the height of the pack (P) of chambers adjacent to the outer end of the conduits of the second group (G2) of chambers is formed only by the latter and by at least one of the chambers of the first group (G1), the remaining of the height of the pack (P) of chambers being formed by the remaining of the chambers of the first group (G1) containing cooling water and by the chambers of the third group (G3) containing lubricant oil.

* * * * *

UNITED STATES PATENT AND TRADEMARK OFFICE
CERTIFICATE OF CORRECTION

PATENT NO.        : 9,810,183 B2
APPLICATION NO.   : 14/900351
DATED             : November 7, 2017
INVENTOR(S)       : Amaral et al.

It is certified that error appears in the above-identified patent and that said Letters Patent is hereby corrected as shown below:

On the Title Page

Item "(72) Inventors:   Tadeu Miguel Malagó Amaral, Sao Paulo, BR; Ricardo Roveri Bueno (Sao Paulo, KR); Edson Valdomiro de Azevedo Junior (Sao Paulo, BR); Fernando Jun Yoshino (Jundiai, BR)" should read
--(72) Inventors:      Tadeu Miguel Malagó Amaral, Sao Paulo, BR; Ricardo Roveri Bueno (Sao Paulo, BR); Edson Valdomiro de Azevedo Junior (Sao Paulo, BR); Fernando Jun Yoshino (Jundiai, BR)--

In the Claims

Column 9
Line 62, "outer end; the outer ends of the conduits of the first group of" should read --outer end; the outer ends of the conduits of the first group (G1) of--

Column 10
Line 27, "to the outer end (61 *b*) of the conduits of the second group" should read --to the outer end of the conduits of the second group--

Signed and Sealed this
Twenty-seventh Day of March, 2018

Andrei Iancu
*Director of the United States Patent and Trademark Office*